United States Patent
Schuhmacher et al.

(10) Patent No.: US 12,451,511 B2
(45) Date of Patent: Oct. 21, 2025

(54) METHOD FOR PRODUCING A CONDUCTIVE COMPOSITE MATERIAL FOR A BATTERY, AND CONDUCTIVE COMPOSITE MATERIAL

(71) Applicant: SCHOTT AG, Mainz (DE)

(72) Inventors: Joerg Schuhmacher, Kornwestheim (DE); Philipp Treis, Bingen am Rhein (DE); Meike Schneider, Taunusstein (DE); Andreas Roters, Mainz (DE); Rolf Samsinger, Rüsselsheim am Main (DE); Sven Schopf, Braunschweig (DE); Arno Kwade, Wendeburg (DE)

(73) Assignee: SCHOTT AG, Mainz (DE)

( * ) Notice: Subject to any disclaimer, the term of this patent is extended or adjusted under 35 U.S.C. 154(b) by 502 days.

(21) Appl. No.: 18/066,676

(22) Filed: Dec. 15, 2022

(65) Prior Publication Data

US 2023/0110781 A1 Apr. 13, 2023

Related U.S. Application Data

(63) Continuation of application No. PCT/EP2021/056522, filed on Mar. 15, 2021.

(30) Foreign Application Priority Data

Jun. 15, 2020 (DE) ..................... 10 2020 207 388.0

(51) Int. Cl.
*H01M 10/056* (2010.01)

(52) U.S. Cl.
CPC .. *H01M 10/056* (2013.01); *H01M 2300/0065* (2013.01); *H01M 2300/0091* (2013.01)

(58) Field of Classification Search
CPC ....... H01M 10/056; H01M 2300/0065; H01M 2300/0091; H01M 2300/0082; H01M 10/0565; H01M 10/0562; Y02E 60/10
See application file for complete search history.

(56) References Cited

U.S. PATENT DOCUMENTS

| 10,886,560 B2 | 1/2021 | Kim |
| 2019/0173130 A1 | 6/2019 | Schuhmacher |

(Continued)

FOREIGN PATENT DOCUMENTS

| DE | 102016217403 | 3/2018 |
| DE | 102016224420 | 6/2018 |

(Continued)

OTHER PUBLICATIONS

DE 102017128719 with English translation (Year: 2019).*

(Continued)

*Primary Examiner* — Robert W Hodge
(74) *Attorney, Agent, or Firm* — Ruggiero McAllister & McMahon LLC (57) ABSTRACT

A method for producing a conductive composite material for a battery such as a solid-state battery includes providing an ion-conducting electrolyte matrix that can be plasticized and that includes an ion-conducting first substance a base substance that can be plasticized and/or a polyelectrolyte; providing a second ion-conducting substance in the form of ion-conducting particles; introducing the ion-conducting particles into the electrolyte matrix to produce a mixture consisting of the ion-conducting particles and the electrolyte matrix; and homogenizing the mixture.

21 Claims, 8 Drawing Sheets

(56) References Cited

U.S. PATENT DOCUMENTS

2019/0386311 A1   12/2019  Bauer
2022/0181684 A1    6/2022  Xu

FOREIGN PATENT DOCUMENTS

| DE | 102017128719 A1 * | 6/2019 | .......... H01M 10/052 |
| --- | --- | --- | --- |
| DE | 102018218486 | 7/2019 | |
| DE | 102018209416 | 12/2019 | |
| EP | 2581979 | 4/2013 | |
| EP | 3492437 A1 * | 6/2019 | ............... C08K 3/34 |
| EP | 3598533 | 1/2020 | |
| EP | 3940836 | 1/2022 | |
| JP | H09306543 | 11/1997 | |
| JP | 2019505074 | 2/2019 | |
| WO | 2020097327 A2 | 5/2020 | |

OTHER PUBLICATIONS

EP 3492437 with English translation (Year: 2019).*
English Translation of the International Search Report dated May 25, 2021 for PCT/EP 2021/056522, 2 pages.
English Translation of the Written Opinion of the International Searching Authority dated May 25, 2021 for PCT/EP 2021/056522, 5 pages.
Wikipedia—Kalander, https://wikipedia.org/wili/Kalander, May 22, 2025. with English translation, 9 pages.
English Translation of the International Preliminary Report on Patentability dated Dec. 13, 2022 for PCT/EP 2021/056522, 6 pages.

* cited by examiner

METHOD FOR PRODUCING A CONDUCTIVE COMPOSITE MATERIAL FOR A BATTERY, AND CONDUCTIVE COMPOSITE MATERIAL

CROSS-REFERENCE TO RELATED APPLICATIONS

This application is a continuation of International Patent Application No. PCT/EP 2021/056522 filed on Mar. 15, 2021, which claims priority to German Patent Application No. 102020207388.0, filed Jun. 15, 2020, the entire contents of all of which are incorporated by reference herein.

BACKGROUND OF THE DISCLOSURE

1. Field of the Disclosure

The present disclosure relates to a method for producing a conductive composite material for a battery, in particular a solid-state battery or the like. The disclosure further relates to a conductive composite material for a battery, in particular a solid-state battery or the like. The disclosure still further relates to a battery, in particular a solid-state battery, comprising a conductive composite material.

2. Description of Related Art

Batteries, in particular lithium-ion batteries, are utilized in many devices, in particular portable devices, such as, for example, portable computers, smart phones, or the like, to supply them with energy. Meanwhile, lithium-ion batteries are also being utilized in electric vehicles to supply energy to the drive. Although known classical lithium-ion batteries have a high energy density, the energy storage possible with known lithium-ion batteries is too small in the automotive sector, in comparison with combustion engines, to compete with the latter in terms of range and safety. Specifications in regard to design space and weight of the batteries in the vehicle limit the possible energy storage capacity. Because known lithium-ion batteries already find themselves near their maximum theoretical energy density, a further increase in the storage capacity is, on the one hand, still only extremely limited and is possible, on the other hand, only at extremely high cost, if at all.

SUMMARY OF THE DISCLOSURE

The disclosure relates to a method for producing a conductive composite material for a battery, in particular a solid-state battery or the like, comprising the following steps:
providing an ion-conducting electrolyte matrix that can be plasticized, comprising at least one ion-conducting first substance, in particular a conductive salt, and a base substance that can be plasticized, in particular in the form of a polymer, and/or at least one polyelectrolyte,
providing a second ion-conducting substance in the form of ion-conducting particles,
introducing the ion-conducting particles into the electrolyte matrix to produce a mixture consisting of the ion-conducting particles and the electrolyte matrix, and homogenizing of the mixture.
The disclosure further relates to a conductive composite material for a battery, in particular a solid-state battery or the like.

The disclosure further relates to a battery, in particular a solid-state battery, comprising a conductive composite material.

Although the present disclosure is generally applicable to any ion-conducting first substance, the present disclosure is explained in reference to lithium bis(trifluoromethane)sulfonimide, LiTFSI, as an ion-conducting first substance.

Although the present disclosure is generally applicable to any base substance that can be plasticized, the present disclosure is explained in reference to polyethylene oxide as a plasticizable base substance.

Although the present disclosure is generally applicable to any batteries, the present disclosure is explained in reference to batteries in the form of lithium-ion batteries or lithium batteries.

An object of the present disclosure is therefore to specify a method for producing a conductive composite material for a battery, a conductive composite material, and a battery containing a conductive composite material, which have a high energy density and can be produced or implemented in a simple and low-cost manner.

A further object of the present disclosure is to specify an alternative method for producing a conductive composite material for a battery, an alternative conductive composite material, and an alternative battery containing a conductive composite material.

In an embodiment, the present disclosure achieves the aforementioned objects by way of a method for producing a conductive composite material for a battery, in particular a solid-state battery or the like, comprising the following steps:
providing an ion-conducting electrolyte matrix that can be plasticized, comprising
at least one ion-conducting first substance, in particular a conductive salt, and a base substance that can be plasticized, in particular in the form of a polymer, and/or
at least one polyelectrolyte,
providing a second ion-conducting substance in the form of ion-conducting particles,
introducing the ion-conducting particles into the electrolyte matrix to produce a mixture consisting of the ion-conducting particles and the electrolyte matrix,
homogenizing of the mixture.
the homogenizing of the mixture is produced by means of at least one method selected from the following list: kneading, extruding, and/or rolling by using a homogenizing device.

In a further embodiment, the present disclosure solves the aforementioned objects by way of a conductive composite material for a battery, in particular a solid-state battery or the like, preferably produced by using a method according to the claim, comprising an ion-conducting electrolyte matrix that can be plasticized, comprising
at least one base substance that can be plasticized, at least one ion-conducting first substance, in particular a conductive salt, and/or
at least one polyelectrolyte,
and at least one ion-conducting second substance in the form of ion-conducting particles, wherein the ion-conducting particles in the electrolyte matrix are homogenized in such a way that, with respect to one another, at least 90% of all ion-conducting particles, preferably at least 95% of all ion-conducting particles, have a minimum distance of separation of at least 100 nm, preferably at least 150 nm, in particular at least 175 nm, preferably at least 200 nm, and/or the particle filling degree of the ion-conducting particles is at least 1 vol %, preferably at least 1.5 vol %, in particular at least 2 vol %, in relation to the total volume of the electrolyte matrix.

In a further embodiment, the present disclosure solves the aforementioned objects by way of a battery, in particular a solid-state battery comprising a conductive composite material according to the claims.

A solid-state battery, in particular in the description and preferably in the claims, is understood to mean a rechargeable battery, in which electrodes and also the electrolyte are made of solid material.

A lithium-ion battery, in particular in the description and preferably in the claims, is understood to mean a rechargeable battery based on lithium compounds in all three phases of the electrochemical cell.

A lithium battery, also referred to as a post-lithium-ion battery, in particular in the description and preferably in the claims, is understood to mean a primary cell, in which lithium or a successor material is used as active material in the negative electrode.

The term "polyelectrolyte," in particular in the description and preferably in the claims, is understood to mean a polymer that bears ionically dissociable groups on each repeating unit. Polyelectrolytes can be subclassified into polyacids and polybases. Inorganic or organic polyacids give rise to polyanions during dissociation with release of protons; polybases give rise to polycations. The term "polyelectrolyte" also comprises polymers that contain charged metal complexes as substituents.

One of the advantages thereby achieved is that, in this way, the ionic conductivity of the conductive composite material can be substantially increased, thereby enabling, in turn, an increase in the maximum possible power capacity of the battery. A further advantage is that the method of production can be carried out in a simple and low-cost manner. In contrast to the methods known from prior art, it is possible in methods in accordance with embodiments of the disclosure to dispense with the use of solvents, thereby affording the advantage that no solvent residues remain in the material.

According to a preferred embodiment, the mixture is actively heated and/or cooled in the homogenizing device in order to provide an at least essentially constant temperature and a plasticizable state of the electrolyte over at least one predeterminable length of time. The advantage of an active heating or an active cooling is that an essentially constant temperature of the mixture can be maintained during homogenization, thereby improving the homogenizing of the mixture by means of the mentioned methods.

According to a further preferred embodiment, before and/or during the introduction of the ion-conducting particles into the electrolyte matrix, the electrolyte matrix is brought into a plasticized state and homogenized, in particular kneaded, by means of the homogenizing device. The advantage of this is that an even faster and more uniform distribution of the ion-conducting particles in the electrolyte matrix is achieved.

According to a further preferred embodiment, the electrolyte matrix is prepared in the form of particles before the homogenization and at least one dispersive mixing operation of the particles of the mixture is carried out. One of the advantages thereby achieved is that, in this way, a further improvement in the homogenization of the mixture can be achieved.

According to a further preferred embodiment, at least one dispersive mixing operation is carried out at a lower temperature than that of the homogenization of the mixture. The advantage of this is that, on the one hand, energy is saved and, on the other hand, a more uniform mixture of the particles is provided, thereby substantially improving the conductivity of the conductive composite material.

According to a further preferred embodiment, the homogenization of the mixture is carried out for a length of time of less than 8 hours, preferably less than 5 hours, especially preferably less than 2 hours, in particular less than 1 hour, preferably less than 0.5 hour. In this way, a best possible homogenization and, at the same time, a high resource efficiency are achieved.

According to a further preferred embodiment, a first dispersive mixing operation of particles of the plasticizable base substance and the ion-conducting particles is carried out in order to obtain a partial mixture and a second dispersive mixing operation of particles of the at least one ion-conducting substance and the particles of the partial mixture is then carried out. The advantage is hereby that, in an especially simple way by means of two dispersive mixing operations, it is possible to provide, in turn, an especially homogeneous (total) mixture and, accordingly, a high conductivity of the conductive composite material.

According to a further preferred embodiment, the ion-conducting particles are provided in the form of ceramic particles, in particular glass-ceramic particles. The advantage of ion-conducting particles in the form of ceramic particles, in particular glass-ceramic particles, is that the ceramic particles have a lower coefficient of thermal expansion than does the purely polymer-based electrolyte matrix. The difference in question can amount to an order of magnitude. The consequence thereof is that the geometry of polymer-electrolyte-based battery components undergoes markedly less alteration during changes in temperature when ion-conducting (glass-ceramic) ceramic particles are integrated into the polymer electrolyte with creation of a hybrid electrolyte. At the same time, however, the flexibility is ensured, this not being the case for conventional, known, pure (glass-ceramic) ceramic solid electrolytes that are prepared by sintering. Furthermore, it is possible in this way also to prepare mechanically stable, thin membranes, which are more stable towards the formation and penetration of detrimental lithium dendrites. A further advantage is that they are electrochemically stable over a wide range and, in addition, have a high conductivity in the preferred temperature range, such as, for example, at room temperature.

According to a further preferred embodiment, the ceramic particles are chosen on the basis of a ceramic containing at least one of the substances taken from the following list:

$P_2O_5$,
$TiO_2$,
$Cr_2O_3$,
$Al_2O_3$,
$Ga_2O_3$,
$Li_2O$,
$Fe_2O_3$,
$GeO_2$,
$ZrO_2$,
$Ta_2O_5$,
$Nb_2O_5$,
$La_2O_3$,
$SiO_2$,
$Gd_2O_3$,
$Y_2O_3$,
$B_2O_3$,
sulfur,
halides, or
nitrogen.

The advantage of this is that, in this way, the flexibility in terms of costs, utilization, and external conditions is increased. A further advantage is that the ceramic particles containing these materials are more resistant towards an influence of water or atmospheric moisture and, for the most part, are low in cost.

According to a further preferred embodiment, the ceramic particles are provided in the form of lithium-based glass-ceramic particles. The advantage of lithium-based glass-ceramic particles is that they have a high conductivity at room temperature and, at the same time, are electrochemically stable. The ion transport number of the lithium ion is 1, whereas, in the case of conventional polymer electrolytes, the ion transport number routinely lies markedly below 0.5; that is, the measured conductivity is due to the transport of lithium ion to the extent of 100% in the first-mentioned case, whereas, in the latter-mentioned case, it is due to the transport of lithium ion to an extent of only less than 50%.

According to a further preferred embodiment, the lithium-based glass-ceramic particles comprise at least one of the following ion conductors:
 ion conductors having a garnet structure, preferably lithium lanthanum zirconium oxide (LLZO),
 ion conductors having a NaSICon structure, preferably lithium aluminum titanium phosphate (LATP) or lithium aluminum germanium phosphate (LAGP) or mixed oxides thereof,
 ion conductors having a perovskite structure, preferably lithium lanthanum titanate (LLT),
 ion conductors having a spinel structure, and/or
 ion conductors having a LiSICon structure, preferably lithium zinc germanate, and
 the plasticizable base substance comprising polyethylene oxide is prepared.

One of the advantages thereby achieved is that, in this way, a simpler conductive composite material is provided, which has a high conductivity at room temperature and, at the same time, is electrochemically stable. Furthermore, an increased mechanical flexibility is provided, which, on the one hand, is advantageous for the production of cell/battery components (for example, by way of the roll-to-roll method). On the other hand, however, it is also possible in this way to compensate mechanically to a large degree for geometric alterations and thus stresses in the cell, such as those that are necessarily entailed by volume changes of active materials in the cathode and anode during charging and discharging of the battery in the course of routine operation. This leads to an increased reliability during operation. A conductive composite material that is prepared in this way, in particular a hybrid electrolyte, thus has an increased conductivity and electrochemical stability on the one hand and a good mechanical flexibility of the polymer-based pendant on the other hand.

According to a further preferred embodiment, the first ion-conducting substance is prepared with at least one conductive salt chosen from the following list:
 lithium salts of sulfonyl imides, preferably $LiN(FSO_2)_2$ (LiFSI), $LiN(SO_2CF_3)_2$ (LiTFSI), and/or $LiN(SO_2C_2F_5)_2$ (LiBETI),
 $LiAsF_6$,
 $LiClO_4$,
 $LiSbF_6$,
 $LiPtCl_6$,
 $LiAlCl_4$,
 $LiGaCl_4$,
 LiSCN,
 $LiAlO_4$,
 $LiCF_3CF_2SO_3$,
 $Li(CF_3)SO_3$ (LiTf),
 $LiC(SO_2CF_3)_3$,
 phosphate-based lithium salts, preferably $LiPF_6$, $LiPF_3(CF_3)_3$ (LiFAP), and $LiPF_4(C_2O_4)$ (LiTFOB),
 borate-based lithium salts, preferably $LiBF_4$, $LiB(C_2O_4)_2$ (LiBOB), $LiBF_2(C_2O_4)$ (LiDFOB), $LiB(C_2O_4)(C_3O_4)$ (LIMOB), $Li(C_2F_5BF_3)$ (LiFAB), and $Li_2B_{12}F_{12}$ (LiDFB),
 lithium salts of sulfonyl imides, preferably $LiN(FSO_2)_2$ (LiFSI), $LiN(SO_2CF_3)_2$ (LiTFSI), and/or $LiN(SO_2C_2F_5)_2$ (LiBETI).

The advantage of this is that, in this way, the flexibility in terms of costs, utilization, and external conditions is increased.

According to a further preferred embodiment, the anion of the lithium salts is chosen from the group comprising $PF_6—$, $BF_4—$, $SbF_6—$, $AsF_6—$, $C_4F_9SO_3—$, $ClO_4—$, $AlO_2—$, $AlCl_4—$, $(C_xF_{2x+1}SO_3)—$, where $0<=x<1$, and/or $(C_xF_{2x+1}SO_2)(C_yF_{2y+1}SO_2)N—$, where $0<=x<1$ and $0<=y<1$. It is hereby also possible to choose or to combine several anions. The advantage of this is that, in this way, the flexibility in terms of costs, utilization, and external conditions is increased.

According to a further preferred embodiment, the lithium salt is chosen from the group comprising $LiClO_4$, $LiBF_4$, lithium bis(oxalate)borate, lithium diflouro(oxalate)borate, $LiSO_3CF_3$, lithium 2-pentafluoroethoxy-1,1,2,2-tetrafluoro-ethanesulfonate, $LiN(FSO_2)_2$ and/or $LiN(SO_2CF_3)_2$, lithium perchlorate ($LiClO_4$), lithium tetrafluoroborate ($LiBF_4$), lithium bis(oxalato)borate (LiBOB), lithium diflouro(oxalate)borate (LiDFOB), $LiSO_3CF_3$ (LiTf), lithium 2-pentafluoroethoxy-1,1,2,2-tetra-fluoroethanesulfonate ($LiSO_3C_2F_4OC_2F_5$), lithium bis(fluorosulfonyl)imide $LiN(FSO_2)_2$ (LiFSI), and/or lithium bis(trifluoromethane)sulfonimide $LiN(SO_2CF_3)_2$ (LiTFSI). It is hereby also possible to combine or to choose together several substances. The advantage of this is that, in this way, the flexibility in terms of costs, utilization, and external conditions is increased.

According to a further preferred embodiment, the ion-conducting particles and the particles of the electrolyte matrix are dried beforehand. One of the advantages thereby achieved is that, in this way, any remaining water on the surface of the particles is removed, thereby preventing an adhesion during the dispersive mixing operation and thus making it possible to achieve an effective mixing. A further advantage is that, in this way, the probability of formation of elemental hydrogen in the battery is reduced, so that, for example, damage to the battery due to gaseous hydrogen resulting from undesired swelling of the battery is substantially reduced. The reliability of the battery is increased in this way.

According to a further preferred embodiment, the ion-conducting particles are introduced into the electrolyte matrix in a volume percent of between 1% and 30%, in particular between 2% and 20%, preferably between 3% and 10%, in particular between 4% and 9%. The advantage of this is an effective utilization of the ion-conducting particles in the conductive composite material for providing a high conductivity thereof. A further advantage is a flexible handling of the conductive composite material as well as a good processing capability thereof in terms production engineering.

According to a further preferred embodiment of the conductive composite material, the ion-conducting particles comprise glass-ceramic particles, in particular lithium-based glass-ceramic particles, preferably lithium aluminum titanium phosphate particles and/or lithium lanthanum zirconium oxide particles. One of the advantages thereby achieved is that, in this way, a simple conductive composite material is provided, which has a high conductivity at room temperature and, at the same time, is electrochemically stable.

According to a further preferred embodiment of the conductive composite material, the plasticizable base substance comprises at least one polymer, in particular polyethylene oxide. As at least one polymer, it is possible to use, for example, polyethylene carbonate (PEC), polypropylene carbonate (PPC), polycaprolactone (PCL), polyacrylnitrile, polyesters, polypropylene oxide, ethylene oxide/propylene oxide copolymer, polyethylene oxide cross-linked with trifunctional urethane, poly(bis(methoxyethoxyethoxide))phosphazene (MEEP), triol-like polyethylene oxide cross-linked with difunctional urethane, poly((oligo)oxyethylene) methacrylate-co-alkali metal methacrylate, polymethylmethacrylate (PMMA), polymethylacrylonitrile (PMAN), polysiloxanes as well as copolymers and derivatives thereof, polyvinylidene fluoride or polyvinylidene chloride as well as copolymers or derivatives thereof, poly(chlorotrifluoroethylene), poly(ethylenechlorotrifluoroethylene), polyfluorinated ethylene propylene, acrylate-based polymers, and condensed or cross-linked combinations thereof and/or physical mixtures thereof, individually or in combination. The advantage of this is that, in this way, the flexibility in terms of costs, utilization, and external conditions is increased.

Further important features and advantages of the disclosure ensue from the dependent claims, from the drawings, and from the associated figure description based on the drawings.

It is obvious that the aforementioned features and the following features that are yet to be explained can be used not only in the respectively presented combination, but also in other combinations or alone, without leaving the scope of the present disclosure.

Preferred implementations and embodiments of the present disclosure are illustrated in the drawings and will be explained in detail in the following description, whereby identical reference signs refer to the same or functionally identical components and elements.

DETAILED DESCRIPTION OF THE DISCLOSURE

For measurement of the respective conductivities, a sintered disc of the materials LLZO and LATP, which are present in powder form, was initially prepared and the contact resistance between a PEO-LiTFSi membrane and the respective disc was measured. Afterwards, the ionic conductivity with respect to different volume proportions of the ion-conducting particles LATP and LLZO was measured. The hybrid electrolytes thus obtained were then compared to a nonconductive $SiO_2$-based polymer material in terms of their conductivities.

Trials

Raw Materials:

In detail, $Li_7La_3Zr_2O_{12}$—LLZO powder and $Li_{1.3}Al_{0.3}Ti_{1.7}P_3O_{12}$—LATP powder were prepared by the use of known industrial methods. The powders hereby have both an amorphous phase and a highly conductive crystalline phase in the core. The amorphous phase can hereby support the lithium-ion based conductivity and, in addition, can improve the compatibility with the respective polymers. Beyond this, the amorphous phase improves the density of the material in comparison to the purely crystalline substances.

For the following trials, LLZO particles with a density of 4.9 $g/cm^3$ and LATP with a density of 2.9 $g/cm^3$ were used. Because the LLZO particles are extremely hygroscopic, the trials were carried out either in a dry room or under inert gas, such as, for example, in an argon-filled container, glovebox, or the like. Preferably, the conductive salt and the polymer are likewise hygroscopic.

The same polymer matrix served as reference, but was cross-linked or mixed with filling material in the form of nonconductive particles composed of hydrophobic, pyrogenic silica gel, procured as AEROSIL® R 812 S from the manufacturer Evonik. The specific surface area measured by means of the BET method was between 195 $m^2/g$ and 245 $m^2/g$. The $SiO_2$ nanoparticles have a water proportion of 0.5% and a carbon proportion of between 3.0% and 4.0%.

The polyethylene oxide, as a plasticizable base substance with the empirical formula $H(C_2H_4O)_nOH$, abbreviated PEO, had a molecular weight of 600,000 g/mol and was procured as POLYOX WSR 205 from the manufacturer Dow. The lithium bis(trifluoromethane)sulfonimide (LiN$(SO_2CF_3)_2$ LiTFSI was procured from the manufacturer Solvionik and used as a polymer electrolyte or first ion-conducting substance.

Ambient Conditions During Processing:

All dispersive mixing processes were carried out as dry mixing processes in a dry room at a temperature of approximately 20° C. and a dew point of between −45° C. and −55° C. Prior to the mixing of all components, they were dried in a vacuum chamber at 40° C. for several hours in order to ensure that any residual water still present is removed from the surface of the particles.

Preparation and Characterization of Sandwich-Like Composite Electrolytes:

Furthermore, pellets were pressed from the LLZO and LATP particles and subsequently sintered in order to prepare homogeneous, dense discs. The discs were polished using SIC#3600 sandpaper. Subsequently, PEO-LiTFSI membranes and copper foil electrodes were arranged on both sides of the respective disc and, in this way, a sandwich-like composite electrolyte was prepared. The diameter of the polymer membranes and the copper foil electrodes was hereby adjusted to the diameter of the discs in order to obtain a homogenous electric field. Subsequently, the sandwich-like composite electrolyte was pressed in a hydraulic press for several minutes at at least 150 kPa and at least 50° C. in order to provide a good coverage or adhesion of the PEO-LiTFSI electrolyte matrix on the sintered discs and the copper foil electrodes. The thickness of this entire system was then measured in order to determine any possible reduction in open porosity between the PEO-LiTFSI electrolyte matrix, the sintered discs, and the copper foil electrodes. In order to determine the thickness of the sandwich-like composite electrolytes, the thickness of the two copper foil electrodes was subtracted.

Preparation of Composite Electrolytes by Mixing in the Tumbler and their Preparation for Characterization:

In order to homogenize the powder mixtures, all substances were mixed beforehand by means of a dispersive mixing operation using a shaker mixture with a rotational speed of between 10 and 100 rotations per minute. Hereby used was a model T2Z drum tumbler or shaker mixer of the company WAB. In a first step, the PEO and the respective oxidic filling material, that is, the $SiO_2$, LATP, or LLZO particles, were mixed for several minutes. In a second step, the conductive salt was then added and mixed several more minutes in order to achieve a homogeneous distribution of the components.

For analysis of the ionic conductivity, the respective powder was pressed to form a pellet with a diameter of 16 mm. Used for this purpose was a MAASEN model MP 250 laboratory press. The pressing force was set at least at 100 kN, so that a pressure of at least 500 MPa was achieved.

Preparation of Composite Electrolytes in the Kneader and their Preparation for Characterization:

For dispersing the oxidic particles in the melted polymer, powder mixtures that were mixed beforehand by means of the drum tumbler mixer were homogenized in a kneader, whereby a HAAKE polyLab Rheomix 610 kneader of the company Thermo Fisher was used. The kneading chamber was hereby heated to above 50° C. While the oxidic particles were being introduced into the kneading chamber, the rotational speed was reduced to a single-digit number of rotations per minute and maintained there until the working volume of the kneader was filled to a maximum of 50%. Subsequently, the rotational speed was increased to more than 50 rotations per minute with an increase of a few rotations per minute each minute. The total kneading time amounted to a few minutes.

Subsequently, the melted hybrid electrolyte mass was taken out and calendered by means of a calendaring device, whereby a laboratory calender of the company Saueressig was used. The calendering rolls were heated to above 100° C. and their circumferential speed was set at less than 0.25 m per minute. It was hereby ensured that the gap between opposite-lying rolls made possible free-standing hybrid electrolyte layers with a thickness of approximately 500 micrometers. By means of a punching device, hybrid electrolyte layers with a thickness of 16 mm were then punched out.

For measurement of the ionic conductivity of the hybrid electrolytes comprising the PEO-LITFSI electrolyte matrix and the various glass-ceramic particle fillers, the hybrid electrolyte discs with a diameter of 16 mm were then placed in standardized battery housing mounts of the type CR2032. Stainless steel spacers as well as corresponding disc springs were utilized inside of the housing to maintain a constant pressure during the conductivity measurement. Furthermore, the battery housings, together with the hybrid electrolyte discs, were then heated to above 70° C. in an oven, with an oven of the company BINDER being used, in order to prevent any crystallization of the PEO of the electrolyte matrix, that is, in order to obtain reproducible results.

Measurement Parameters for the Characterization:

Used for recording of the measured values was potentiostatic, electrochemical impedance spectroscopy by means of ZAHNER ZEHNIUM instruments at a voltage amplitude of 10 mV and at frequencies of between 0.1 and $4 \times 10^7$ Hz. Used for the determination of the plot was the software RelaxIS 3 of the company rhd instruments.

For the determination of the particle sizes, x-ray diffraction measurements using the X'Pert Pro MPD diffractometer of the company Panalytical were carried out and the results were refined by means of the software HighScorePlus of the same company. Slices of the discs were prepared and corresponding images were recorded by means of a model NEO 40 scanning electron microscope of the company ZEISS at a voltage of between 15 kV and 20 kV. The particle size distribution was subsequently determined by means of Cilas 1064 of the company 3P INSTRUMENTS.

Reference without Application of (Glass-Ceramic) Ceramic Ion Conductor Particles:

In order to prevent the occurrence of accumulations or "flocculations" of the PEO-LiTFSI electrolyte matrix, a small quantity of nonconductive $SiO_2$ nanoparticles were added for comparison—as already discussed above—and utilized as a reference for a comparison with the conductive particles LLZO and LATP.

Results of the Trials

Figure 1A:
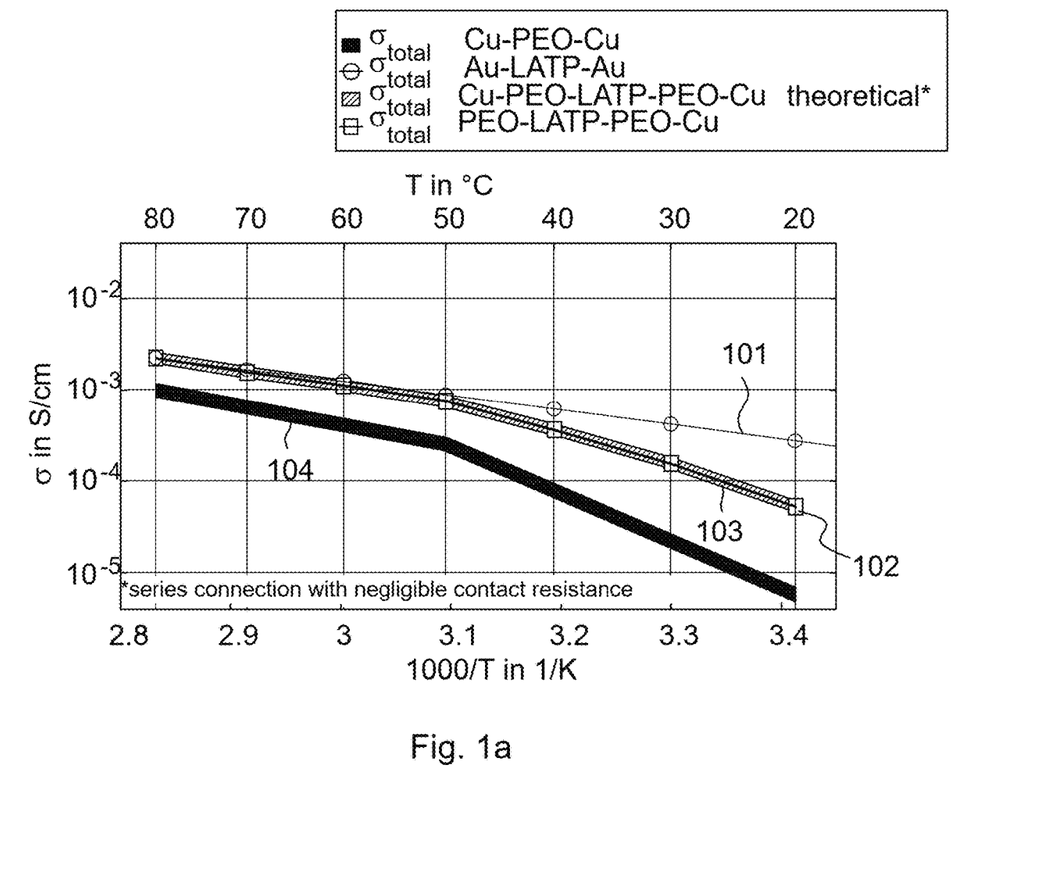
FIG. 1 is a diagram for the conductivity of known conductive material and of conductive material in accordance with an embodiment of the present disclosure during heating (FIG. 1a) and during cooling (FIG. 1b)
Figure 1B:
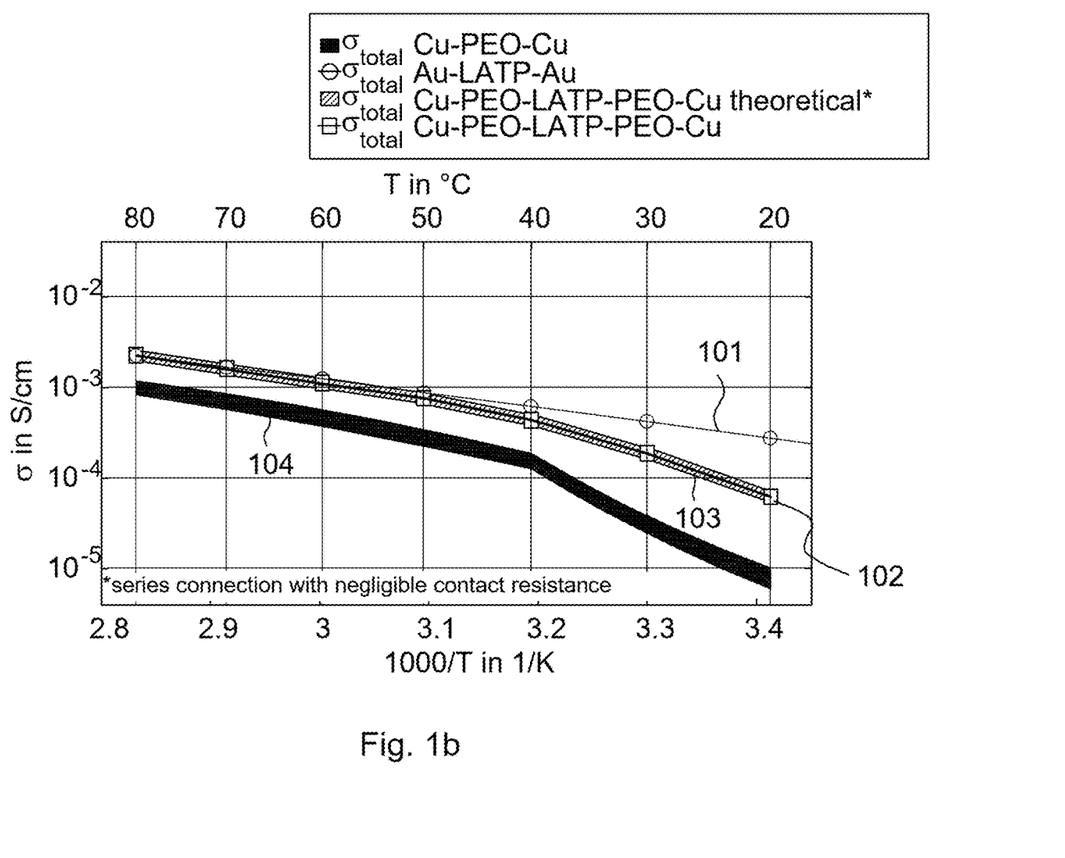

FIG. 1 shows a diagram for the conductivity of known conductive material and of conductive material in accordance with an embodiment of the present disclosure during heating (FIG. 1a) and during cooling (FIG. 1b).

In detail, FIG. 1 shows, in the partial FIGS. 1a and 1b, the absolute conductivity in S/cm plotted versus the temperature (upper horizontal axis in each case) and inverse temperature (lower horizontal axis in each case). The reference signs hereby designate the following:

reference sign 104 designates the plotted curve of the conductivity for a PEO-LiTFSI electrolyte matrix containing 2.2 vol % $SiO_2$ as filling material together with copper electrodes as reference for a known ion-conducting composite material in the form of a membrane—which is referred to below as a reference membrane, reference sign 103 designates the theoretical plotted curve of the conductivity for a PEO-LATP-PEO composite material with copper electrodes, reference sign 102 designates the measured plotted curve of the conductivity for a PEO-LATP-PEO composite material with copper electrodes, and reference sign 101 designates the measured plotted curve of the conductivity for a sintered LATP disc with gold electrodes.

FIG. 1*a* hereby describes the plot of the respective conductivity during the heating process and FIG. 1*b* hereby describes the plot of the respective conductivity during the cooling process. Because the PEO of the electrolyte matrix tends to undergo crystallization below the melting point, the impedance spectra or conductivity of FIGS. 1*a* and 1*b* were recorded separately. The corresponding uncertainty in the polymer conductivity is rendered visually by means of a correspondingly broad curve 104. The error bars of the conductivity 101, 102, 103 amount to less than 5% at the respective point of measurement.

Figure 2A:
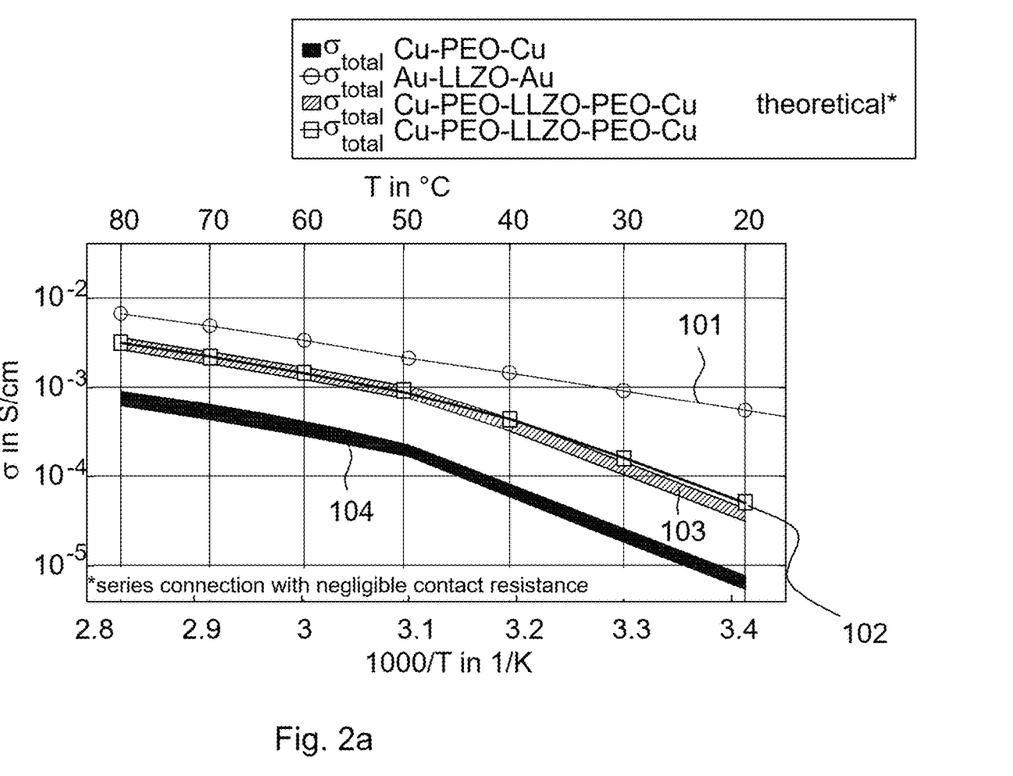
FIG. 2 is a diagram for the conductivity of known conductive material and of conductive material in accordance with an embodiment of the present disclosure during heating (FIG. 2a) and during cooling (FIG. 2b)
Figure 2B:
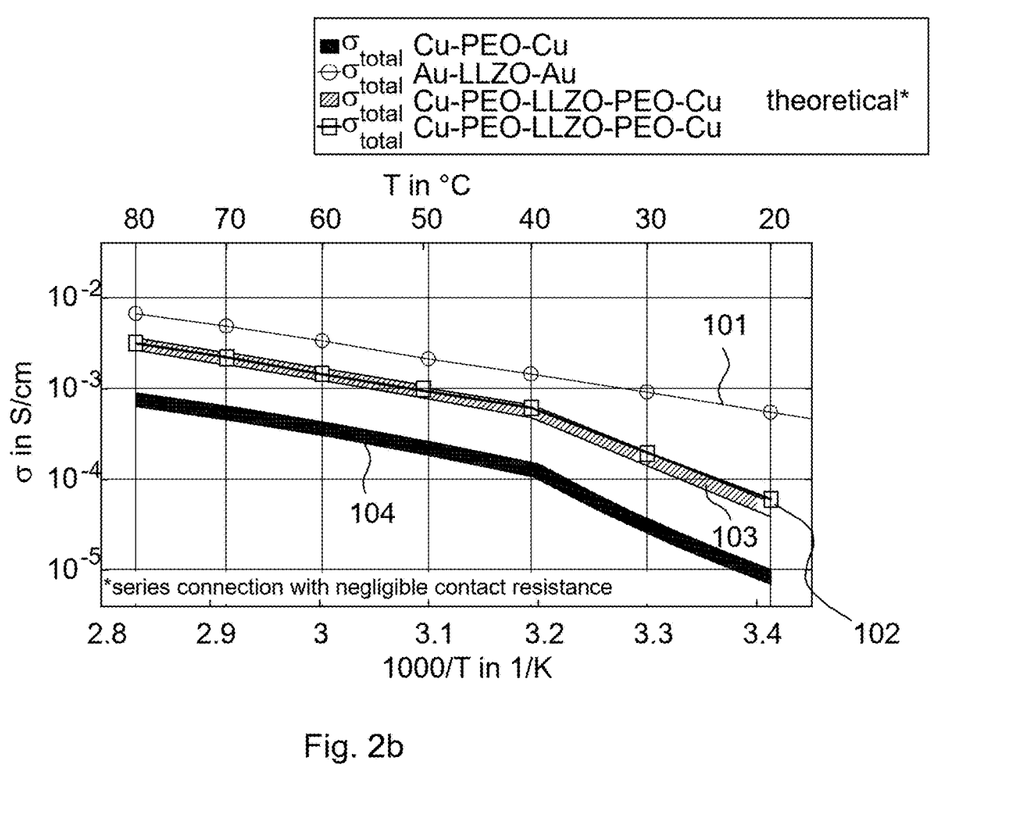

FIG. 2 shows a diagram for the conductivity of known conductive material and of conductive material in accordance with an embodiment of the present disclosure during heating (FIG. 2*a*) and during cooling (FIG. 2*b*).

In detail, FIG. 2 shows, in the partial FIGS. 2*a* and 2*b*, the temperature-dependent absolute conductivity in S/cm plotted versus the temperature (upper horizontal axis in each case) and inverse temperature (lower horizontal axis in each case). The reference signs hereby designate the following:

reference sign 104 designates the plotted curve of the conductivity for a PEO-LiTFSI electrolyte matrix containing 2.2 vol % $SiO_2$ as filling material together with copper electrodes as reference for a known ion-conducting composite material in the form of a membrane—referred to below as a reference membrane, reference sign 103 designates the theoretical plotted curve of the conductivity for a PEO-LLZO-PEO composite material with copper electrodes, reference sign 102 designates the measured plotted curve of the conductivity for a PEO-LLZO-PEO composite material with copper electrodes, and reference sign 101 designates the measured plotted curve of the conductivity for a sintered LLZO disc with gold electrodes.

FIG. 2*a* hereby describes the temperature-dependent plot of the respective conductivity during the heating process and FIG. 2*b* hereby describes the plot of the respective conductivity during the cooling process. Because the PEO of the electrolyte matrix tends to undergo crystallization below the melting point, the impedance spectra or conductivity of FIGS. 2*a* and 2*b* were recorded separately. The corresponding uncertainty in the conductivity of the polymer conductivity is rendered visually by means of a correspondingly broad curve 104. The error bars of the conductivity 101, 102, 103 amount to less than 5% at the respective point of measurement.

Figure 3:
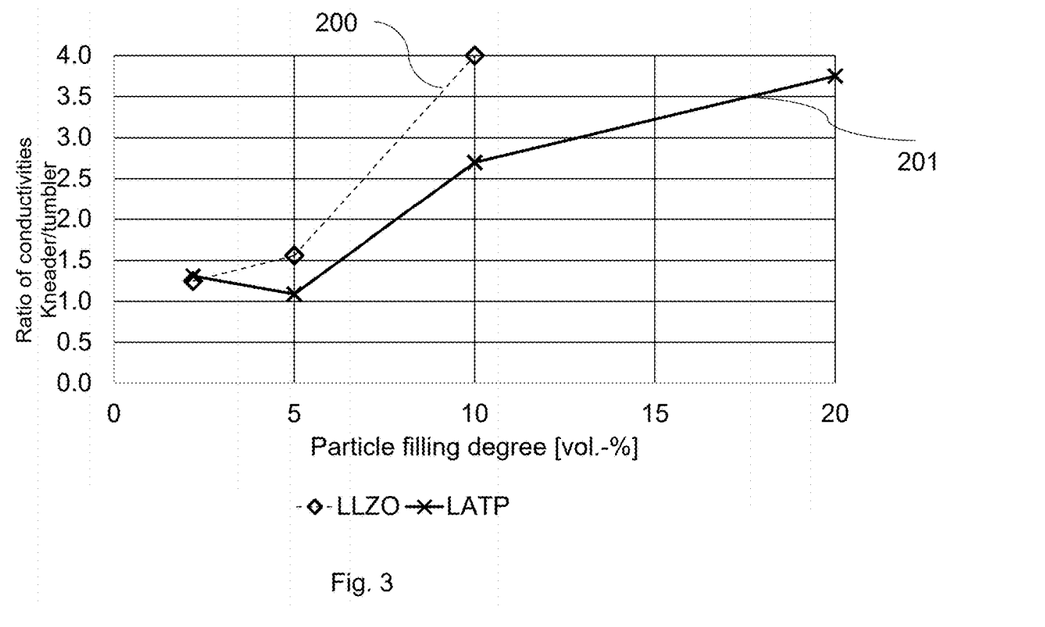
FIG. 3 is a diagram with the ratio of conductivities after use of a tumbling or kneading process depending on the particle filling degree of two different ion-conducting particles in accordance with an embodiment of the present disclosure.

FIG. 3 shows a diagram with the ratio of conductivities after respective use of a tumbling process or of a tumbling process followed by a kneading process depending on the particle filling degree of two different ion-conducting particles in accordance with an embodiment of the present disclosure.

In detail, FIG. 3 shows a comparison of the ratio of the conductivity depending on the degree of filling of LATP and LLZO, each admixed one time by means of a kneading process and admixed one time by means of a tumbling process into the PEO-LiTFSi electrolyte matrix. In the case of the tumbling process, the measurements of the conductivity were carried out after 72 hours at 80° C. in order to make possible an adequate homogenization and a connectivity with the electrodes.

Comparison of the curves 200 and 201 hereby reveals that, when the degree of filling is the same, the addition of LLZO particles provides, starting at essentially 2 vol %, a substantially higher conductivity in the conductive composite material than does the addition of LATP particles, when the same mixing process—kneading or tumbling—is used. In turn, comparison of the ratio of conductivities in terms of the respective mixing process reveals that the kneading makes possible a substantially higher conductivity than does the tumbling mixing process over the total range shown here of between 0 and 20 vol %.

Figure 4:
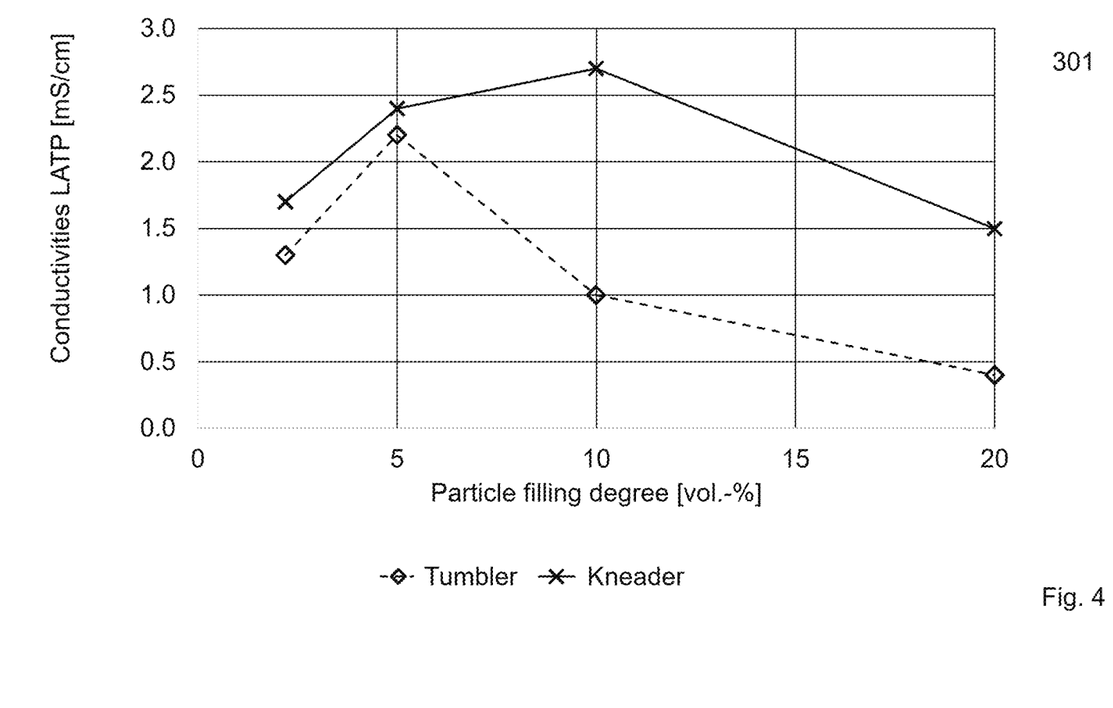
FIG. 4 is a diagram with the measured conductivities for ion-conducting particles in the form of LLZO after use of a tumbling or kneading process depending on the particle filling degree in accordance with an embodiment of the present disclosure.
Figure 5:
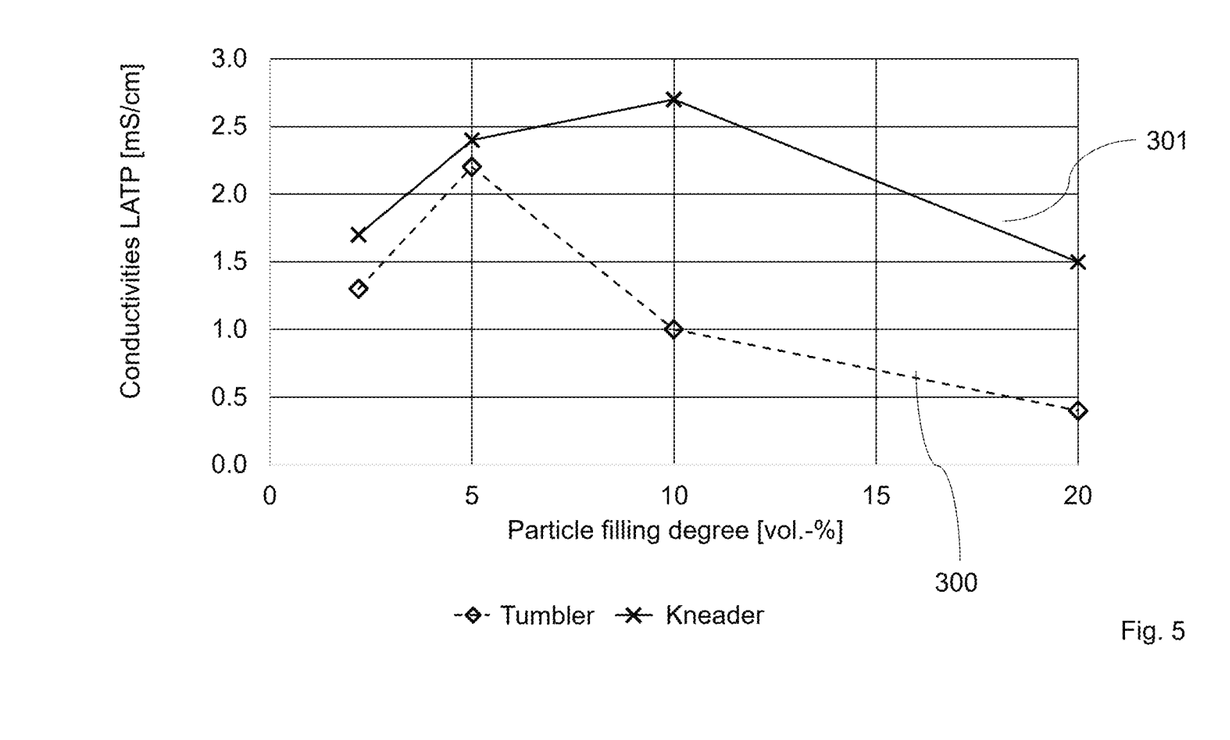
FIG. 5 is a diagram with the measured conductivities for ion-conducting particles in the form of LATP after use of a tumbling or kneading process depending on the particle filling degree in accordance with an embodiment of the present disclosure.

FIG. 4 shows a diagram of the measured conductivity of the conductive composite material for addition of LLZO particles after use of a tumbling process or kneading process depending on the particle filling degree in accordance with an embodiment of the present disclosure and FIG. 5 shows a diagram with the measured conductivity of the conductive composite material with added LATP particles after use of a tumbling process or kneading process depending on the particle filling degree in accordance with an embodiment of the present disclosure.

In detail, FIG. 4 shows the absolute measured conductivity for a conductive composite material furnished with LLZO particles, which were admixed by means of a kneading process and a tumbling mixing process into the PEO-LiTFSi matrix of the composite material, and FIG. 5 shows the corresponding absolute measured conductivity correspondingly for LATP particles.

Both when LATP particles are used and in the case of LLZO particles, the attained conductivity 301, when the kneading mixing process is used, is higher than for the use of a tumbling mixing process (reference sign 300). In contrast to the use of LLZO particles in FIG. 4, even when a tumbling mixing process is used, the conductivity 300 initially increases to a maximum at 5 vol %, above which it then already drops, whereas, when the kneading process is used, the conductivity 301 further increases up to a maximum of 10 vol % and only then drops.

Figure 6:
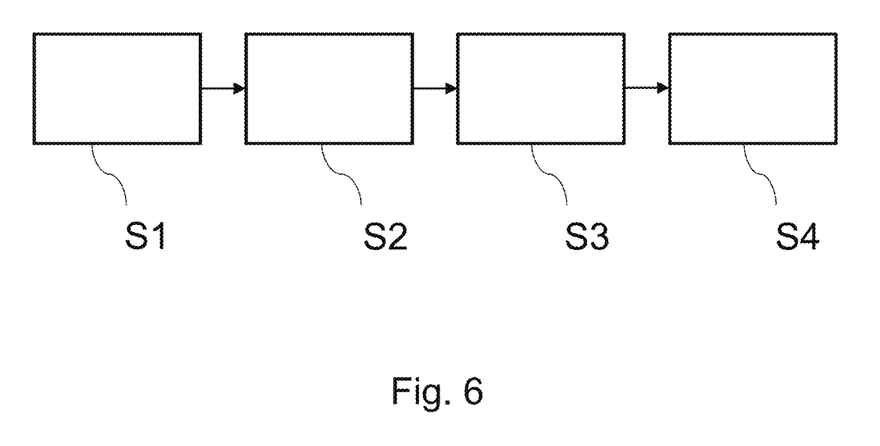
FIG. 6 shows steps of a method in accordance with an embodiment of the present disclosure.

FIG. 6 shows steps of a method in accordance with an embodiment of the present disclosure.

In detail, FIG. 6 shows steps of a method for producing a conductive composite material for a battery, in particular a solid-state battery or the like.

The method hereby comprises the following steps:

In a first step S1, an ion-conducting electrolyte matrix that can be plasticized is provided, comprising at least one ion-conducting first substance, in particular a conductive salt, and a base substance that can be plasticized, in particular in the form of a polymer. Alternatively or additionally, at least one polyelectrolyte can form the electrolyte matrix.

In a further step S2, a second ion-conducting substance is provided in the form of ion-conducting particles.

In a further step S3, the ion-conducting particles are introduced into the electrolyte matrix to produce a mixture composed of the ion-conducting particles and the electrolyte matrix.

In a further step S4, the mixture is homogenized, the mixture being homogenized by means of at least one method selected from the following list: kneading, extruding, and/or rolling by use of a homogenizing device.

In summary, at least one of the embodiments of the disclosure has at least one of the following advantages:

good homogenization of the ion-conducting particles in an electrolyte matrix.

high conductivity, in particular a conductivity that is greater by a factor of 2 in comparison to the reference containing a nonconductive filling material.

simple preparation, in particular without additional solvent.

Although the present disclosure was described on the basis of preferred exemplary embodiments, it is not limited to them, but can be modified in diverse ways.

LIST OF REFERENCE NUMBERS 101 plotted curve of the conductivity
102 plotted curve of the conductivity
103 plotted curve of the conductivity
104 plotted curve of the conductivity
200 ratio of conductivities kneader/tumbler—LATP
201 ratio of conductivities kneader/tumbler—LLZO
300 conductivities—kneader
301 conductivities—tumbler

What is claimed is:

1. A method for producing a conductive composite material for a battery, the method comprising: providing an electrolyte matrix that is ion-conducting and plasticizable, the electrolyte matrix comprising a first ion-conducting substance and a plasticizable base substance or a polyelectrolyte; providing ion-conducting particles; introducing the ion-conducting particles into the electrolyte matrix to produce a mixture consisting of the ion-conducting particles and the electrolyte matrix; homogenizing the mixture with a homogenizing device; and homogenizing the mixture for a length of time of less than 8 hours, wherein the ion-conducting particles and the electrolyte matrix are homogenized so that the ion-conducting particles have a minimum distance of separation of at least 100 nm, and a particle filling of the ion-conducting particles is at least 1% by volume in relation to a total volume of the electrolyte matrix; wherein homogenizing the mixture is selected from the group consisting of: kneading, extruding, and rolling.

2. The method according to claim 1, further comprising: actively heating or cooling the mixture in the homogenizing device to provide the electrolyte matrix at an at least essentially constant temperature and plasticized state for at least one predeterminable period of time.

3. The method according to claim 1, further comprising, before or during the introducing: plasticizing the electrolyte matrix and homogenizing the electrolyte matrix by kneading with the homogenizing device.

4. The method according to claim 1, wherein the homogenizing is carried out for less than 5 hours.

5. The method according to claim 1, further comprising, prior to the homogenizing:
providing the electrolyte matrix in a particle form; and
dispersive mixing the mixture.

6. The method according to claim 5, wherein the dispersive mixing is carried out at a lower temperature than the homogenizing.

7. The method according to claim 5, wherein the dispersive mixing comprises: a first dispersive mixing operation of particles of the plasticizable base substance and the ion-conducting particles to obtain a partial mixture and a second dispersive mixing operation of particles of the at least one ion-conducting substance and the particles of the partial mixture.

8. The method according to claim 1, wherein the ion-conducting particles are ceramic particles.

9. The method according to claim 8, wherein the ceramic particles comprise at least one material selected from the group consisting of: $P_2O_5$, $TiO_2$, $Cr_2O_3$, $Al_2O_3$, $Ga_2O_3$, $Li_2O$, $Fe_2O_3$, $GeO_2$, $ZrO_2$, $Ta_2O_5$, $Nb_2O_5$, $La_2O_3$, $SiO_2$, $Gd_2O_3$, $Y_2O_3$, $B_2O_3$, sulfur, halides, and nitrogen.

10. The method according to claim 8, wherein the ceramic particles are lithium-based, glass-ceramic particles.

11. The method according to claim 10, wherein the lithium-based, glass-ceramic particles comprise at least one ion conductor selected from the group consisting of: ion conductors having a garnet structure, ion conductors having a NaSICon structure, ion conductors having a perovskite structure, ion conductors having a spinel structure, ion conductors having a LiSICon structure, and lithium zinc germanate, and wherein the plasticizable base substance comprises polyethylene oxide.

12. The method according to claim 1, wherein the first ion-conducting substance comprises at least one lithium salt selected from the group consisting of: lithium salts of sulfonyl imides, $LiAsF_6$, $LiClO_4$, $LiSbF_6$, $LiPtCl_6$, $LiAlCl_4$, $LiGaCl_4$, $LiSCN$, $LiAlO_4$, $LiCF_3CF_2SO_3$, $Li(CF_3)SO_3$ (LiTf), $LiC(SO_2CF_3)_3$, phosphate-based lithium salts, borate-based lithium salts, and lithium salts of sulfonyl imides.

13. The method according to claim 12, wherein the lithium salt comprises at least one anion selected from the group consisting of: $PF_6^-$, $BF_4^-$, $SbF_6^-$, $AsF_6^-$, $C_4F_9SO_3^-$, $ClO_4^-$, $AlO_2^-$, $AlCl_4^-$, $(C_xF_{2x+1}SO_3)^-$, where $0 \leq x < 1$, and $(C_xF_{2x+1}SO_2)(C_yF_{2y+1}SO_2)N^-$, where $0 \leq x < 1$ and $0 \leq y < 1$.

14. The method according to claim 1, wherein the first ion-conducting substance comprises at least one lithium salt selected from the group consisting of: $LiClO_4$, $LiBF_4$, lithium bis(oxalate)borate, lithium diflouro(oxalate)borate, $LiSO_3CF_3$, lithium 2-penta-fluoroethoxy-1,1,2,2-tetrafluoroethanesulfonate, $LiN(FSO_2)_2$, $LiN(SO_2CF_3)_2$, lithium perchlorate ($LiClO_4$), lithium tetrafluoroborate ($LiBF_4$), lithium bis(oxalato)borate (LiBOB), lithium diflouro(oxalate)borate (LiDFOB), $LiSO_3CF_3$ (LiTf), lithium 2-penta-fluoroethoxy-1,1,2,2-tetrafluoroethanesulfonate ($LiSO_3C_2F_4OC_2F_5$), lithium bis(fluorosulfonyl)imide ($LiN(FSO_2)_2$ (LIFSI), and lithium bis(trifluoromethane)sulfonimide ($LiN(SO_2CF_3)_2$ (LiTFSI).

15. The method according to claim 1, further comprising: drying the ion-conducting particles.

16. The method according to claim 1, wherein the ion-conducting particles introduced into the electrolyte matrix are provided in a volume percent of between 1% and 30% in the electrolyte matrix.

17. A conductive composite material for a battery, comprising: an electrolyte matrix that is ion-conducting and plasticizable, comprising a plasticizable base substance, an ion-conducting first substance, or a polyelectrolyte; and an ion-conducting second substance in ion-conducting particle form, wherein the ion-conducting particles and the electrolyte matrix are homogenized so that the ion-conducting particles have a minimum distance of separation of at least 100 nm, and a particle filling degree of the ion-conducting particles is at least 1 vol % in relation to a total volume of the electrolyte matrix.

18. The composite material according to claim 17, wherein the ion-conducting second substance comprises lithium-based glass-ceramic particles.

19. The composite material according to claim 17, wherein the plasticizable base substance comprises polyethylene oxide.

20. The composite material according to claim 17, wherein the ion-conducting particles have a volume percent of between 1% and 30% in the electrolyte matrix.

21. A battery, comprising the conductive composite material according to claim 17.

\* \* \* \* \*